(12) United States Patent
Turmeau et al.

(10) Patent No.: US 9,481,379 B2
(45) Date of Patent: Nov. 1, 2016

(54) RAILWAY AXLEBOX ASSEMBLY AND RAILWAY AXLEBOX INCLUDING THE SAME

(71) Applicants: Arnaud Turmeau, Mallisard (FR); Laurent Paulin, Monnaie (FR)

(72) Inventors: Arnaud Turmeau, Mallisard (FR); Laurent Paulin, Monnaie (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/448,179

(22) Filed: Jul. 31, 2014

(65) Prior Publication Data

US 2015/0036954 A1 Feb. 5, 2015

(30) Foreign Application Priority Data

Jul. 31, 2013 (EP) .................................. 13306107

(51) Int. Cl.
*F16C 33/78* (2006.01)
*B61F 15/22* (2006.01)
*B61F 15/02* (2006.01)

(52) U.S. Cl.
CPC ............... *B61F 15/22* (2013.01); *B61F 15/02* (2013.01); *F16C 33/7826* (2013.01)

(58) Field of Classification Search
CPC ... F16C 33/78; F16C 33/782; F16C 33/7826
See application file for complete search history.

(56) References Cited

U.S. PATENT DOCUMENTS

| | | | | |
|---|---|---|---|---|
| 2,260,955 A * | 10/1941 | Rudd | ...................... | B61F 15/14 384/459 |
| 2,600,434 A * | 6/1952 | Saywell | ........................ | 384/482 |
| 2,660,490 A * | 11/1953 | Jones | ...................... | B61F 15/14 384/459 |
| 2,712,480 A * | 7/1955 | Viktor | ...................... | B61F 15/18 384/459 |
| 2,802,705 A * | 8/1957 | Halvorsen | ............... | B61F 15/16 384/459 |
| 2,875,004 A * | 2/1959 | McNicoll | ................ | B61F 15/12 384/459 |
| 2,891,827 A * | 6/1959 | Butkus | ..................... | F16C 33/78 277/356 |
| 2,962,328 A * | 11/1960 | Benktander | ............. | B61F 15/16 384/459 |
| 2,977,138 A * | 3/1961 | Brittain, Jr. | .............. | B61F 15/22 277/356 |
| 2,981,574 A * | 4/1961 | McNicoll | ................. | B61F 15/12 105/221.1 |
| 3,038,766 A * | 6/1962 | Alston | ..................... | B61F 15/16 384/459 |
| 3,494,682 A * | 2/1970 | Keller | ............................ | 384/487 |
| 4,798,481 A * | 1/1989 | Frank | ............................ | 384/477 |
| 5,242,229 A * | 9/1993 | McLarty | ........................ | 384/484 |
| 6,126,321 A * | 10/2000 | Fetty | ..................... | F16C 19/386 384/459 |
| 7,314,219 B1 | 1/2008 | Horvath | | |
| 2008/0106041 A1* | 5/2008 | Shibayama et al. | .......... | 277/399 |
| 2010/0322544 A1* | 12/2010 | Hubbard | ............. | F16C 33/7853 384/478 |
| 2011/0085755 A1* | 4/2011 | Pruden | ................ | F16C 33/7879 384/486 |
| 2012/0082407 A1 | 4/2012 | Fetty | | |

FOREIGN PATENT DOCUMENTS

| | | |
|---|---|---|
| DE | 102012001379 A1 | 9/2012 |
| GB | 1197196 A * | 7/1970 |
| JP | 2008202729 A | 9/2008 |

* cited by examiner

*Primary Examiner* — Thomas R. Hannon
(74) *Attorney, Agent, or Firm* — Bryan Peckjian; SKF USA Inc. Patent Dept.

(57) ABSTRACT

A railway axlebox assembly including a bearing including an inner ring adapted to be mounted on a shaft with an axial preload and an outer ring adapted to be mounted in a housing, a backing ring delivering axial support of the inner ring on an inner end portion of the shaft is provided. The assembly includes a seal that is disposed between the backing ring and the inner end portion of the housing. The sealing includes an elastomeric sealing lip bearing with a frictional contact on a sealing surface provided on the backing ring.

20 Claims, 2 Drawing Sheets

RAILWAY AXLEBOX ASSEMBLY AND RAILWAY AXLEBOX INCLUDING THE SAME

CROSS-REFERENCE TO RELATED APPLICATION

This application claims priority to European Patent Application No. EP13306107 filed Jul. 31, 2013, the contents of which are herein fully incorporated by reference.

FIELD OF THE INVENTION

The invention relates to a railway axlebox assembly including a bearing including an inner ring adapted to be mounted on a shaft with axial preload and an outer ring adapted to be mounted in a housing, a backing ring providing axial support of the inner ring on an inner end portion of the shaft, and a sealing provided between the backing ring and the inner end portion of the housing.

BACKGROUND OF THE INVENTION

Sealing units provided in bearing assemblies of railway axleboxes have to be designed such that they operate under very harsh conditions including temperature changes in a wide range, humidity and introducing dust or dirt from the outside while at the same time maintaining the sealing function and avoiding leakage of oil or grease out of the room accommodating the rollers of the bearings.

Hitherto, it was presumed that elastomeric seals are not suitable for applications requiring high robustness such as railway axlebox seals and that a friction contact would result in excessive wear in applications where dust may enter the contact surface.

The prior art therefore relied on felt rings or labyrinth seals.

Existing sealing units include seals which can be mounted directly on the bearing. However, this solution is available only for cylindrical roller bearings, tapered roller bearings or compact tapered roller bearings, because a special mechanic of the bearing is needed, which is not available for other types of bearings.

Further, it is known to provide a machined labyrinth-sealing between the backing ring and the housing or rear cover. This labyrinth can be positioned such that the parts engage with each other in an axial or radial direction. In principle, the small gap avoids most of the external intrusions. However, the efficiency of this sealing is directly linked to the size of the clearance inside the labyrinth. However, tolerances and permissible displacement must be considered so that the clearances have to be big enough to safely avoid collisions. The drawback of labyrinth seals besides of the high manufacturing costs is a feature that the labyrinth acts as a pump for the bearing grease which is moved outside the housing.

The traditional solution for the sealing is based on felt strips used in positions between the housing and the backing ring. This kind of sealing has a random efficiency depending on the wear and the environmental condition including temperature, ice, humidity etc. The purpose of the felt strip is to avoid the dust intrusion. However, in order to be efficient, it has to be protected by a labyrinth ring provided axially outside of the felt strip. The felt strip creates important friction which is reduced over the time, and experience shows that the service life of this component is not sufficient for most modern railway applications.

SUMMARY OF THE INVENTION

The inventions seeks to solve the above problems of the prior art by providing a railway axlebox assembly which is cost-saving while ensuring a sufficiently long service life.

The invention starts from a railway axlebox assembly including a bearing including an inner ring adapted to be mounted on a shaft with axial preload and an outer ring adapted to be mounted in a housing, a backing ring providing axial support of the inner ring on an inner end portion of the shaft; and a sealing provided between the backing ring and the inner end portion of the housing.

It is proposed that the sealing includes an elastomeric sealing lip with friction contact on a pertinent sealing surface provided on the backing ring. The inventors have found that the problem of wear of elastomeric seals can be overcome and that the assumption that elastomeric seals are not suitable for applications requiring high robustness such as railway axlebox seals is based on a technical prejudice.

Further, it is proposed that the sealing surface is a surface of an anti-friction sleeve. The use of an anti-friction sleeve is advantageous, because it reduces wear while avoiding high manufacturing costs as they could be the consequence of high-precision machining of a radially outer surface of the backing ring. Further, the anti-friction sleeve enables a simple replacement once the sleeve is worn out.

In a preferred embodiment of the invention, the anti-friction sleeve includes a stainless steel sleeve with a wall-thickness of less than 0.5 mm, preferably less than 0.3 mm, and more than 0.1 mm. Anti-friction sleeves of this type are available under the trade name "Speedi Sleeve".

Further, it is proposed that the anti-friction sleeve is press-fitted over the backing ring. This facilitates the assembly and leads to a robust fixation.

As an alternative to the anti-friction ring or in addition to this, it is proposed that the sealing surface is a surface coated with anti-friction coating, wherein the sealing surface may be a radially outer surface of the anti-friction ring in the former case.

In a preferred embodiment of the invention, the sealing surface is a radially outer surface of the backing ring, in particular the radially outermost surface thereof. Further, it is proposed that the sealing lip is fixed on a radially inner surface of the housing and protrudes radially inward. This configuration facilitates the manufacturing of the sealing lip as compared to other configuration, wherein the sealing lip protrudes radially outward and the sealing surface faces radially inward.

In a preferred embodiment of the invention, the sealing lip is a V-ring sealing. This ensures a tight sealing with two or more sealing lips arranged in a series while avoiding high costs.

A further aspect of the invention relates to a railway axlebox including an axlebox assembly as described above.

The following non-limiting description of embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE EMBODIMENTS

Figure 1:
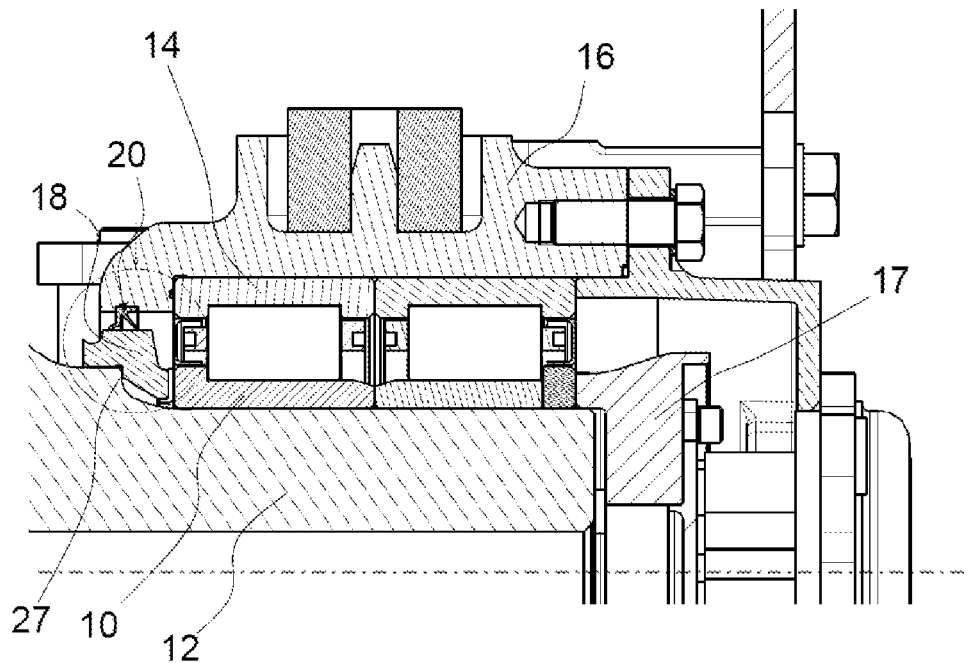
FIG. 1 illustrates a railway axlebox including a railway axlebox assembly according to an embodiment of the invention.

FIG. 1 illustrates a railway axlebox including a bearing including an inner ring adapted to be mounted on a shaft 12 with axial preload and an outer ring 14 adapted to be mounted in a housing 16, a backing ring 18 providing axial support of the inner ring 10 on an inner end portion of the shaft 12, and a seal 20 provided between the backing ring 18 and the inner end portion of the housing 16.

Here and in the following, the expression "axially inner end portion" refers to the end of the shaft facing the pertinent wheel as opposed to the axially outer end portion provided with an end plate 17.

The bearing is a double-row roller bearing with split inner- and outer ring, wherein only one of the rows is illustrated. The inner ring 10 is fitted over the shaft 12 and clamped thereon by means of the end plate 17. The shaft 12 has an inner end portion with a rounded profile continuously connecting an essentially cylindrical main part of the shaft 12 with a radially protruding shoulder portion 27.

The backing ring 18 supports the inner ring 10 and is provided with a step on a radially inner surface. The step rests on the shoulder 27 of the shaft 12 and supports the axial load of the bearing generated by the clamping action of the end plate. A sealing surface 22 of the backing ring 18 is barrel-shaped and located radially above the step of the inner surface of the backing ring 18.

The bearing may be provided with an additional, integrated sealing including parts fixed on the inner- and outer ring respectively.

Figure 2:
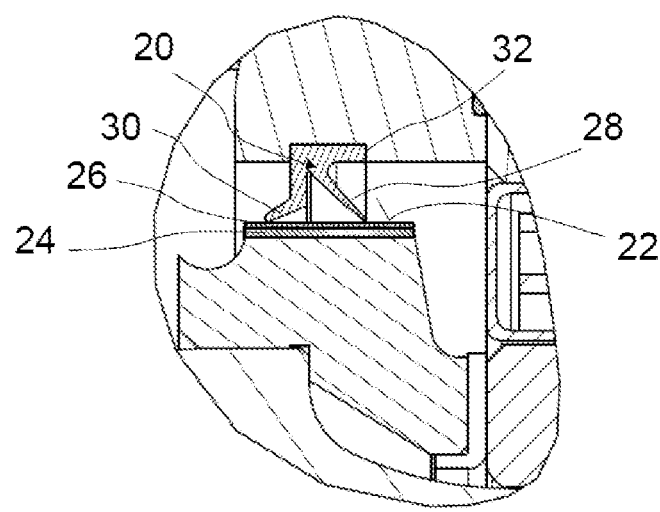
FIG. 2 is a detail of FIG. 1.

As illustrated in more detail in FIG. 2, the seal 20 includes two elastomeric sealing lips 28, 30 bearing with friction contact on a pertinent sealing surface 22 provided on the backing ring 18. The sealing surface 22 is the radially outer surface of an anti-friction sleeve 24. The anti-friction sleeve 24 is press-fitted over the radially outermost surface of the backing ring 18.

The anti-friction sleeve 24 includes a stainless steel sleeve with a wall-thickness of 0.28 mm and the radially outer sealing surface 22 thereof is coated with anti-friction coating 26.

The seal 20 is fixed in a pertinent groove 32 on a radially inner surface of the housing 16 and protrudes radially inward.

As shown in FIG. 2, the seal 20 is a V-ring sealing containing an axially inner lip 28 and an axially outer lip 30, wherein the axially inner lip 28 rests on the sealing surface 20 so as to be deflected axially inward and the axially outer lip 30 rests on the sealing surface 20 so as to be deflected axially outward.

As a consequence, the axially outer lip 30 basically protects the bearing from intrusions of particles from the outside, whereas the axially inner lip basically prevents leakage of grease to the outside.

Figure 3:
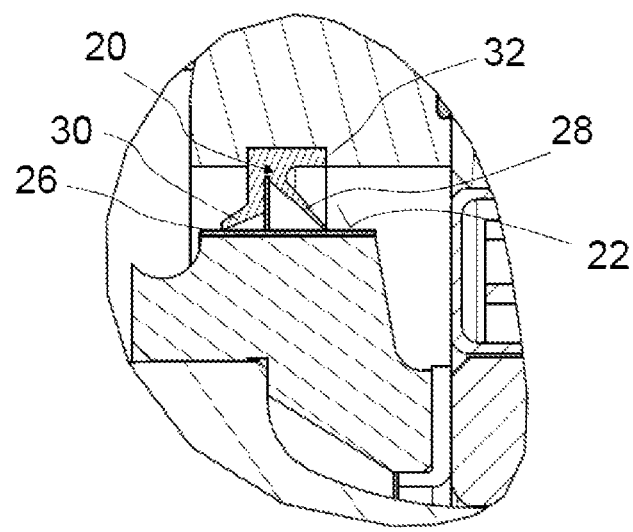
FIG. 3 illustrates a railway axlebox assembly according to a second embodiment of the invention.

FIG. 3 shows a further possible embodiment of the invention. In order to avoid repetitions, the following description focuses on differences to the embodiment of FIGS. 1 and 2, and the reader is referred to the description of FIGS. 1 and 2 or features which are similar or identical. In order to highlight the common function or concept, the same or similar reference numbers are employed for features having identical or very similar features.

The radially outermost surface of the backing ring 18 of the railway axlebox assembly according to FIG. 2 is directly coated with an anti-friction coating 26 without there being an anti-friction sleeve 24 provided as in FIG. 1. The radially outer surface is machined prior to applying the coating 26.

As to what concerns the coating 26 in the embodiments in FIGS. 1 and 2, any suitable coating including coatings with dry-lubricants, nitrocarburation, tungsten carbide, diamond-like carbon, black oxide or tungsten disulfide may be used. Further, the surface of the sleeve 24 in the embodiment of FIG. 1 on a radially outer surface of the backing ring 18 may be hardened so as to ensure a sufficiently long service life.

The sealing arrangement according to the invention ensures reliable protection of the bearing against grease leakage and no supplementary protection on bearing is necessary. However, supplementary protection e.g. by a labyrinth seal placed axially outside of the V-ring sealing may be provided if deemed necessary.

The solution of the invention ensures low friction compared to felt rings or felt strip system, whereas compared to a labyrinth system, the sealing tightness is better and there is no risk of collision due to the clearance of the system even when the requirements on the machining precision are reduced in order to reduce costs.

Since no additional sealing on the bearing is necessary, the costs of the bearing may be further reduced and the selection of the bearings may be extended.

Last but not least, the bearing according to the invention is particularly suitable for space optimization and weight reduction.

The invention claimed is:

1. A railway axlebox assembly comprising:
    a bearing having an inner ring mounted on a shaft with an axial preload and an outer ring adapted to be mounted in a housing;
    a backing ring providing axial support of the inner ring disposed on an inner end portion of the shaft; and
    a seal provided between the backing ring and an inner end portion of the housing;
    wherein the seal includes an elastomeric sealing lip bearing with friction contact on a sealing surface provided on the backing ring,
    wherein the sealing surface is a surface of the backing ring that is directly coated with an anti-friction coating, and
    wherein the backing ring includes a step on a radially inner surface, the sealing surface being located radially above the step.

2. The railway axlebox assembly according to claim 1, wherein the inner ring and the outer ring are split rings.

3. The railway axlebox assembly according to claim 1, wherein the sealing lip is fixed on a radially inner surface of the housing and protrudes radially inward.

4. The railway axlebox assembly according to claim 3, wherein the radially inner surface of the housing includes a groove, and wherein the seal is fixed in the groove.

5. The railway axlebox assembly according to claim 1, wherein the sealing surface is a radially outer surface of the backing ring.

6. The railway axlebox assembly according to claim 1, wherein the sealing lip is a V-ring seal.

7. The railway axlebox assembly according to claim 1, wherein shaft includes a shoulder, and wherein the step is positioned on the shoulder of the shaft.

8. The railway axlebox assembly according to claim 1, wherein the sealing surface is the radially outermost surface of the backing ring.

9. The railway axlebox assembly according to claim 1, wherein the elastomeric sealing lip is configured to be deflected axially inward.

10. The railway axlebox assembly according to claim 9, wherein the seal includes a second elastomeric lip in contact with the sealing surface, the second elastomeric lip configured to be deflected axially outward.

11. The railway axlebox assembly according to claim 1, wherein the anti-friction coating comprises at least one of nitrocarburation, tungsten carbide, diamond-like carbon, black oxide or tungsten disulfide.

12. A railway axlebox assembly comprising:
    a bearing having an inner ring mounted on a shaft with an axial preload and an outer ring adapted to be mounted in a housing;
    a backing ring providing axial support of the inner ring disposed on an inner end portion of the shaft; and
    a seal provided between the backing ring and an inner end portion of the housing;
    wherein the seal includes an elastomeric sealing lip bearing with friction contact on a sealing surface provided on the backing ring,
    wherein the sealing surface is a surface coated with anti-friction coating,
    wherein the anti-friction coating comprises at least one of nitrocarburation, tungsten carbide, diamond-like carbon, black oxide or tungsten disulfide, and
    wherein the backing ring includes a step on a radially inner surface, the sealing surface being located radially above the step.

13. The railway axlebox assembly according to claim 12, wherein the sealing surface is a surface of an anti-friction sleeve.

14. The railway axlebox assembly according to claim 13, wherein the anti-friction sleeve includes a stainless steel sleeve with a wall-thickness of less than 0.5 mm.

15. The railway axlebox assembly according to claim 13, wherein the anti-friction sleeve is press-fitted over the backing ring.

16. The railway axlebox assembly according to claim 13, wherein the anti-friction sleeve includes a stainless steel sleeve with a wall-thickness of less than 0.3 mm.

17. The railway axlebox assembly according to claim 13, wherein the anti-friction sleeve includes a stainless steel sleeve with a wall-thickness more than 0.1 mm.

18. The railway axlebox assembly according to claim 12, wherein the inner ring and the outer ring are split rings.

19. A railway axlebox comprising:
    an axlebox assembly having;
    a bearing having an inner ring mounted on a shaft with an axial preload and an outer ring adapted to be mounted in a housing;
    a backing ring providing axial support of the inner ring disposed on an inner end portion of the shaft; and
    a seal provided between the backing ring and an inner end portion of the housing;
    wherein the seal includes an elastomeric sealing lip bearing with friction contact on a sealing surface provided on the backing ring,
    wherein the sealing surface is a surface of the backing ring that is directly coated with an anti-friction coating, and
    wherein the backing ring includes a step on a radially inner surface, the sealing surface being located radially above the step.

20. The railway axlebox assembly according to claim 19, wherein the inner ring and the outer ring are split rings.

\* \* \* \* \*